United States Patent

[11] 3,590,365

| | | |
|---|---|---|
| [72] | Inventor | Raymond L. Nelson<br>Rochester, N.Y. |
| [21] | Appl. No. | 854,993 |
| [22] | Filed | Sept. 3, 1969 |
| [45] | Patented | June 29, 1971 |
| [73] | Assignee | Eastman Kodak Company<br>Rochester, N.Y. |

[54] TEMPERATURE CONTROL APPARATUS
7 Claims, 2 Drawing Figs.

[52] U.S. Cl. .................................................. 323/19,
219/494, 219/505, 318/334, 318/471, 323/24,
323/38
[51] Int. Cl. ....................................................... G05f 1/44
[50] Field of Search........................................... 318/334,
471; 323/4, 9, 16—22, 19, 22 T, 23, 24, 25,
34—37, 38; 219/494, 505; 307/310; 321/16, 18

[56] References Cited
UNITED STATES PATENTS

| | | | |
|---|---|---|---|
| 3,243,685 | 3/1966 | Burley............................ | 321/16 |
| 3,469,177 | 9/1969 | Lorenz........................... | 323/19 |
| 3,473,101 | 10/1969 | Muskovac...................... | 318/344 |
| 3,475,677 | 10/1969 | Swinehart et al. ............ | 323/21 |
| 3,512,077 | 5/1970 | Evalds........................... | 323/19 |

OTHER REFERENCES

IBM TECH. DISCLOSURE BULLETIN Vol. 8, No. 5 Oct. 1965; " Temperature Control Ckt." by J. J. Petersen; Copy in 323/24

*Primary Examiner*—J. D. Miller
*Assistant Examiner*—Gerald Goldberg
*Attorneys*—R. W. Hampton and R. L. Gable

ABSTRACT: Apparatus for controlling the energization of a heat producing element in response to the electrical output derived from a temperature sensitive element such as a thermister. More particularly, the apparatus includes an element or group of elements responsive to potentials, either positive or negative, above a predetermined level to be rendered conductive, a pair of transistors whose emitters are connected to an element such as a thermister whose impedance is dependent upon temperature and a pair of unidirectional conducting devices such as diodes for alternatively applying an AC voltage to the transistors. A potential is developed across the thermister, which serves to control the potential applied to the heat producing element.

RAYMOND L. NELSON
INVENTOR.

BY

Robert W Hampton
ATTORNEYS

RAYMOND L. NELSON
INVENTOR.

BY

ATTORNEYS

TEMPERATURE CONTROL APPARATUS

CROSS-REFERENCE TO RELATED APPLICATIONS

Reference is made to commonly assigned copending U.S. Pat. Application Ser. No. 854,482, entitled "Control Apparatus for Developing Processor," filed Sept. 2, 1969 in the name of Claire L. James.

BACKGROUND OF THE INVENTION

1. Field of the Invention

This invention relates to apparatus for regulating the amount of power applied to or the energization of a load from a source of AC voltage or, more particularly, to control circuits having an element therein sensitive to temperature for controlling the energization of a load, such as a heating element.

2. Description of the Prior Art

There has recently been developed apparatus in the form of electrical circuits for controlling the application or energization by an AC voltage source of a load. In particular, these circuits rely on a class of devices including silicon controlled rectifiers, diacs and triacs or combinations thereof to control the portion of the cycle of the AC voltage source during which the source is applied to the load. More particularly, such circuits serve to apply the AC voltage at a predetermined point in the AC cycle dependent upon an input signal. The control circuits will continue to conduct and to apply the power to the load until the potential source returns to zero. In the other half of the cycle, the circuit will remain inoperative, i.e., nonconductive, until the preselected point is reached when the circuit will be rendered conductive to apply the AC potential to the load. Thus, by controlling the portion in which the AC source is applied to the load, the amount of power applied to the load may likewise be controlled.

Temperature sensitive circuits have been developed in conjunction with the above-described phase controlled circuit to regulate the application of an AC potential source dependent upon temperature. Such a combination of circuits would have application to situations where it would be desired to control the energization of heating elements and/or a fan motor. In one example of the prior art, a temperature sensitive element such as a thermister was incorporated into a bridge circuit whose output was applied to a differential circuit. The output signal derived from the differential circuit was in turn applied to a power control circuit to thereby determine the phase at which the circuit becomes operative to apply the AC potential to a fan driving motor. Such circuits are rather complicated and tend to increase the cost of the apparatus provided for controlling the temperature.

It is therefore an object of this invention to control the application of an AC potential source as a function of temperature with an uncomplicated circuit at modest cost.

SUMMARY OF THE INVENTION

These and other objects are accomplished in accordance with the teachings of this invention by providing a temperature sensing circuit for controlling the application or energization of a load by an AC potential source. More particularly, the control circuit includes a pair of devices such as transistors whose emitters are connected to a temperature sensitive element such as a thermister. The collectors of the transistors are connected to unidirectional conductive devices such as diodes for alternatively applying the potential source to one of the transistors dependent upon the polarity of the potential of the source. An input signal, whose amplitude is a function of the amplitude of the AC potential source is applied to the bases of the transistors to thereby successively render each transistor operative or inoperative. The amount of current drawn from each of the transistors is dependent upon the impedance of the thermister and the voltage generated thereby is applied to a power control circuit to thereby control the application of the potential source to a heating element.

In one illustrative embodiment of this invention, a second pair of transistors may be incorporated within the temperature control circuit to increase the gain and temperature sensitivity of the control circuit. Further, the range of temperature response may be adjusted by a suitable variable impedance circuit to thereby control the magnitude of the voltage applied to the bases of the transistors.

The invention, and its objects and advantages, will become more apparent in the detailed description of the preferred embodiment presented below.

BRIEF DESCRIPTION OF THE DRAWING

In the detailed description of the preferred embodiment of the invention presented below, reference is made to the accompanying drawing, in which.

DESCRIPTION OF THE PREFERRED EMBODIMENT

Figure 1:
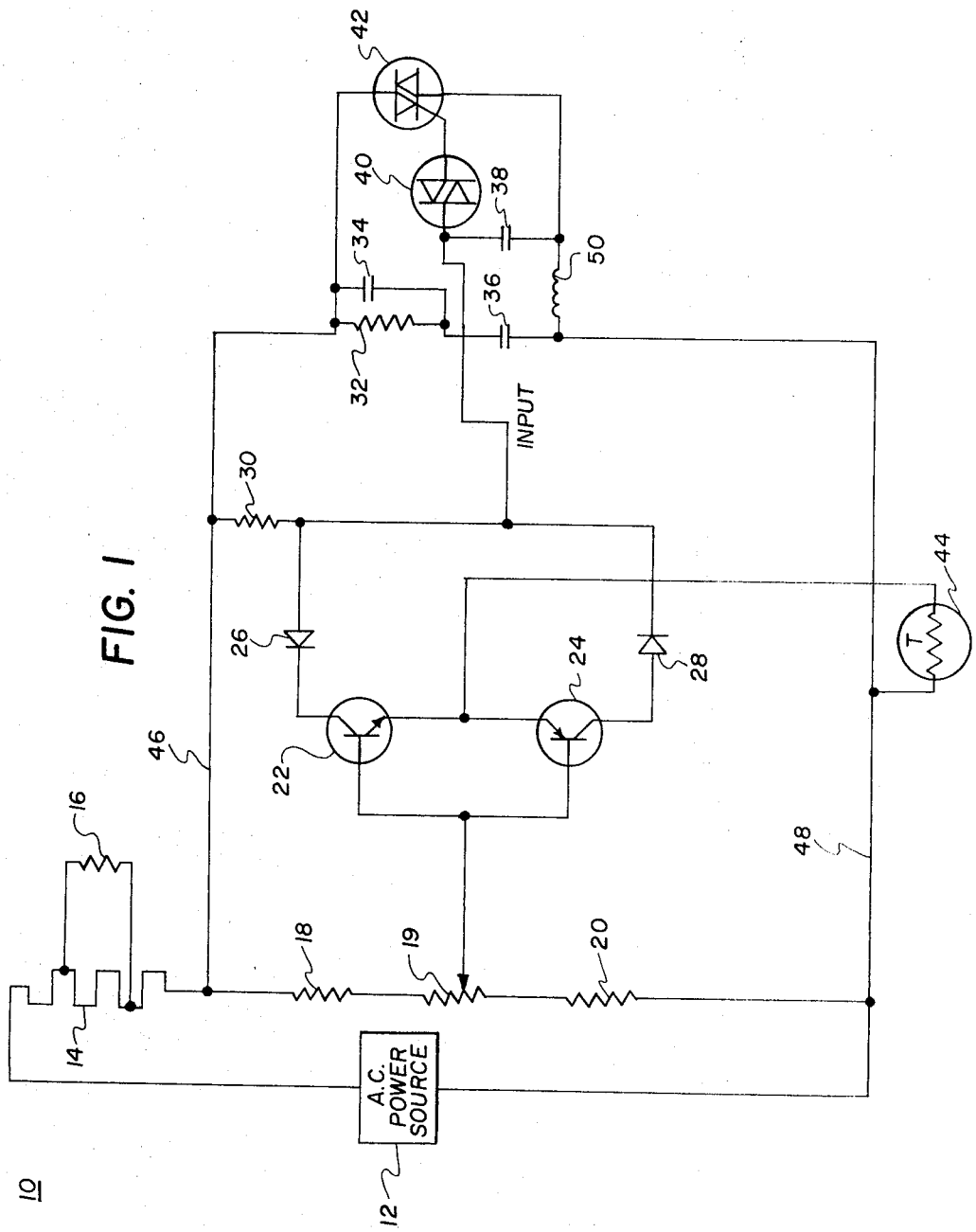
FIG. 1 shows a schematic representation of a temperature sensitive circuit in accordance with the teachings of this invention.

Referring now to the drawings and in particular to FIG. 1, in which is shown a circuit 10 for controlling the application or energization of a load taking the form of a heating element 14 by an AC power source 12. In particular, the AC power source 12 is applied across the heating element 14, which in turn is connected in series with a resistor 18, a variable resistor 19, and a resistor 20. A tap taken from the variable resistor 19 is applied to the bases of a pair of transistors 22 and 24 which are tied together as indicated in FIG. 1, the transistors 22 and 24 are of opposite conductivity types. The emitters of the transistors 22 and 24 are tied together at a common point and connected to a suitable heating sensing element 44, such as a thermister. One terminal of the thermister 44 is connected to a conductor 48 which is connected to the AC power source 12 and the resistor 20.

A point common to the heating element 14 and the resistor 18 is connected by a conductor 46 to a resistor 30. The collectors of transistors 22 and 24 are connected by suitable unidirectional conductive devices such as diodes 26 and 28 to a common point, which point is coupled to the resistor 30 and also to an input of the power control portion of the circuit 10. A resistor 16 is interconnected over a central portion of the heating element 14. The heating element 14 may take the form of a coil of relatively high resistance wires whose central portions may tend to overheat; the shunt resistor 16 serves to bypass a portion of the current directed through the heating element 14 to thereby insure the more uniform generation of heat along the length of the heating element 14.

The power control portion of the temperature control circuit 10 includes a diac 40 connected to a point of interconnection of the diodes 26 and 28. The input signal derived from diodes 26 and 28 is applied to the diac 40 across a capacitor 38. The diac 40 is in turn connected to the input gate of the triac 42. The output terminals of the triac 42 are connected to the conductor 46 and also through an inductive element 50 to conductor 48. A filtering network is formed across the conductors 46 and 48 of a capacitor 34 connected in parallel with a resistor 32, which elements are connected in series with a second capacitor 36. The filtering network prevents the irratic firing of the triac 42 due to transients with short rise time appearing across the triac 42.

In operation, the triac 42 is rendered conductive in response to changes of impedance of the thermister 44 to thereby directly connect the AC power source 12 across the heater element 14 and to thereby energize the heater element 14 to generate heat. Illustratively, the temperature control circuit 10 could be used in an apparatus for developing sensitized paper by the application of heat as described in the above identified copending application Ser. No. 854,482 entitled "Control Apparatus for Developing Processor." As the voltage derived from the source 12 rises positively from a zero potential, the triac 42 is disposed in an inoperative or nonconductive state with the result that the voltage derived from the source 12 is divided between the heater element 14 and the resistors 18, 19 and 20 and that the current flow through the heater element 14 is relatively small. The potential applied to the bases of the transistors 22 and 24 may be adjusted by adjusting the tap of the variable resistors 19 to thereby set the temperature control circuit 10 for operation at various temperature levels. As the potential from source 12 becomes more positive, a point is reached when the potential derived from the tap or variable resistor 19 will bias the transistor 22 to its "on" or conductive state. The positive potential derived from the source 12 is applied through a resistor 30 and the forward biased diode 26 to be placed across the transistor 22 and the thermister 44. Typically, the thermister 44 responds to increases in temperatures by a decrease in the impedance or resistance presented thereby. Conversely, as the temperature decreases, the impedance offered by thermister 44 increases. Thus, at relatively high temperatures, the thermister 44 will offer a relatively small resistance and the current drawn from the emitter of transistor 22 will be relatively large. It is noted that the positive going signal applied across resistor 30 is blocked by reverse biased diode 28 from being applied to the transistor 24.

The diac 40 operates as a bidirectional trigger diode which will be fired when a potential either positive or negative of a selected level is applied to thereby fire or render conductive the triac 42. The potential at which the triac 42 will be rendered conductive is determined by the potential at the junction of the diac 40, the diodes 26 and 28, and the resistor 30. It is noted that a resistive network is formed by the resistor 30, and the impedance presented by either the transistor 22 or the transistor 24, and the impedance of thermister 44. Thus, when the current drawn by the thermister 44 increases, the potential applied to the diac 40 will be kept below the point where the diac 40 and the triac 42 will be rendered conductive. Thus, at relatively high temperatures, the thermister 44 will offer a relatively small resistance and the potential applied to the diac 40 will be insufficient to fire this element. However, as the temperature increases, the impedance of the thermister 44 will increase, thereby drawing less current from the emitter of transistor 22. As a result, the potential applied to the diac 40 will increase to the point where it is fired, which will in turn tender the triac 42 conductive. With the triac 42 conductive, a substantial portion of the power derived from the AC power source 12 will be applied to the heater element 14 which will continue to generate heat until after a number of cycles, the thermisters 44 impedance decreases to the point at which the diac 40 will be kept "off." When the potential from source 12 returns to zero, the triac 42 will be disposed in its inoperative or nonconductive state. As the potential derived from source 12 goes negatively, a substantially similar process occurs in which a negative potential is applied to the base of transitor 24 to thereby render transistor 24 conductive. Further, the negative potential is applied through the now forward biased diode 28 to the collector of transistor 24 while the diode 26 blocks the negative potential from being applied to the transistor 22.

In an illustrative embodiment of the temperature control circuit 10 shown in FIG. 1, the elements of the circuit may take the following values:

Resistor 16_____ohms__8
Resistor 18_____ohms__100,000
Resistor 19_____ohms__5,000
Resistor 20_____ohms__11,000
Resistor 30_____ohms__30,000
Thermister_____(Fenwall)__GA5151
Transistor 22_____2N3859
Transistor 24_____2N4249
Diodes 26 and 28_____1N3754

Elements 32, 34, 36, 50, 38, 40 and 42 may illustratively have the values of the elements of a standard General Electric triac subassembly S100F3.

Figure 2:
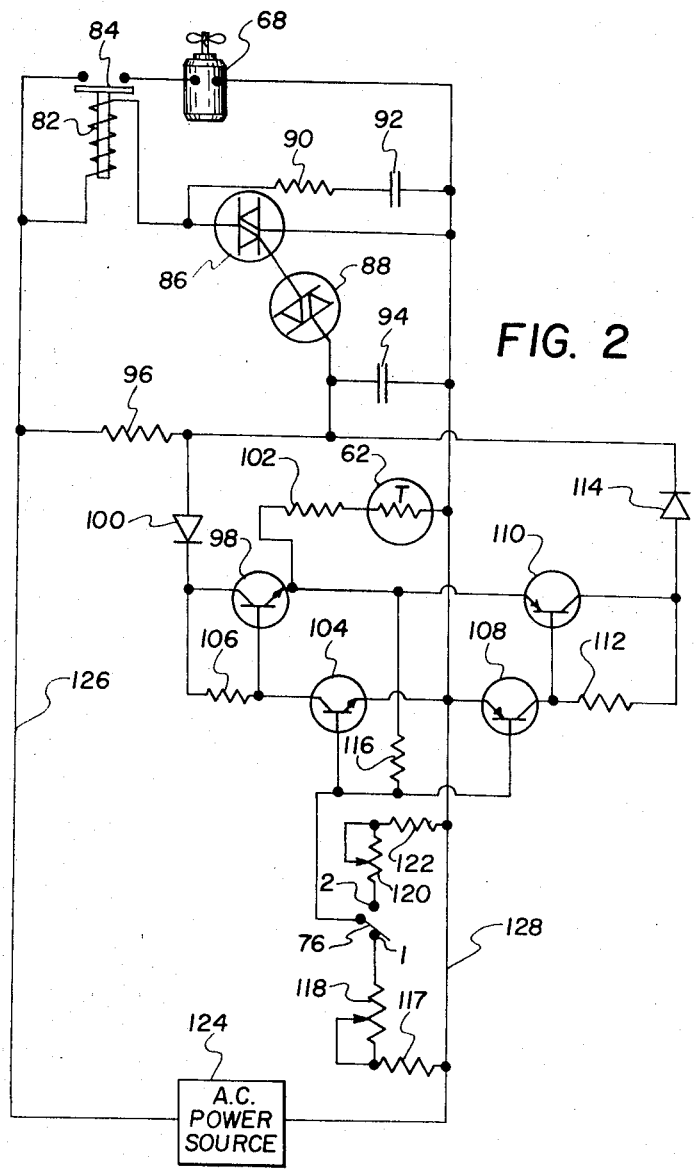
FIG. 2 shows a schematic view of another embodiment of a temperature control circuit in accordance with the teachings of this invention.

With reference to FIG. 2, there is shown an electrical circuit which is designed to control the operation of a fan motor 68 in response to a temperature sensing means such as a thermister 62. A suitable source 124 of alternating current is applied through a pair of conductors 126 and 128 across the fan motor 68 by an armature switch 84, which is operated between an open and closed position by an armature coil 82. In turn, the armature coil 82 is energized by a switch means comprised of a triac 86 connected in series across the alternating power source 124 and a diac 88 connected to the gate of the triac 86. A resistor 90 and a capacitor 92 are connected in series across the triac 86 in order to prevent the premature firing of the triac 86 due to transients with short rise times appearing across the triac 86. The diac 88 is connected through a capacitor 94 to the conductor 128 and to the midpoint between diodes 100 and 114. The diodes 100 and 114 are connected through a resistor 96 to the conductor 126; the resistor 96 is of such a value to determine the potential at which the diac 88 and thus the triac 86 will be fired to their conductive states. Diode 100 is connected to the collector of a transistor 98 and also through a resistor 106 to the base of the transistor 98. Further, the emitter of transistor 98 is connected in series through a resistor 102 and the thermister 62 to the conductor 128. In a similar manner, the diode 114 is connected to the collector of a transistor 110 and through a resistor 112 to the base of the transistor 110. The bases of transistors 98 and 110 are respectively connected to the collectors of transistors 104 and 108. As shown in FIG. 2, the emitters of transistors 104 and 108 are commonly connected to conductor 128. A resistor 116 is interconnected between the point of connection between the bases of transistors 104 and 108, and the point of connection between the emitters of transistors 98 and 110. Further, the point of connection between the bases of the transistors 104 and 108 is connected to a switch 76, which is disposable between first and second positions. When the switch 76 is disposed in its first position, the circuit of FIG. 2 is adjusted to detect a low range of temperatures in the order of approximately 200° F. to 230° F. More specifically, the switch 76 in its first position is connected in series through an adjustable resistor 118 and a resistor 117 to conductor 128. When the switch 76 is disposed in its second position, the circuit of FIG. 2 is adjusted to detect a high range of temperatures in the order of approximately 490° F. to 525° F. In the second position, the switch 76 is connected in series through an adjustable resistor 120 and a resistor 122 to the conductor 128. The resistors 118 and 120 are adjusted to precisely determine when the motor 68 will be turned on to cool the ambient environment.

Briefly, the operation of the circuit of FIG. 2 depends upon the change of resistance of the thermister 62 in response to changes of the ambient temperature. If the initial, ambient temperature is relatively low, the impedance presented to the circuit by the thermister 62 is relatively high. When a positive-going signal of the source 124 is connected through the resistor 96 to the diodes 100 and 114, the signal is blocked by the diode 114 and is conducted by the forward biased diode 100 to be applied through the resistor 106 to the base of transistor 98 thereby rendering transistor 98 conductive. As a result, a positive signal is applied through the resistor 116 to the base of the transistor 104, thereby tending to turn on the transistor 104 to a conductive state and applying a more negative signal to the base of the transistor 98. An equilibrium condition is achieved in which the transistor 98 is rendered partially conductive to allow only a relatively small current to be drawn therethrough. Thus the impedance presented between the point of interconnection of the diode 100 and the resistor 96, and conductor 128 through the path provided by the diode 100, the transistor 98, resistor 102 and thermister 62 is relatively high, and a positive potential is developed across the resistor 96 and the capacitor 94 to thereby fire the diac 88 and the triac 86. With the triac 86 in a conductive state, current is drawn through the solenoid coil 82 and the armature switch 84 is withdrawn and the motor 68 remains nonoperative.

As the ambient temperature rises, the resistance of the thermister 62 decreases. As a result, when the positive signal is applied through the resistor 96 and the diode 100, the transistor 98 is similarly biased to a conductive state, and as a result, a positive signal is applied to the base of transistor 104 thereby tending to bias the transistor 104 to its conductive state. However, with an increased temperature applied to the thermister 62, thermister 62 will present a lower resistance and a greater current will be drawn through the transistor 98, the resistor 102 and the thermister 62 to conductor 128. The potential applied through the resistance 116 to the base of transistor 104 will be reduced or become more negative thereby tending to render transistor 104 less conductive. In turn, the transistor 98 is turned more fully on and the impedance between the point of interconnection of the diode 100 and resistor 96 and conductor 128 is substantially reduced. When this state occurs, the potential applied across the capacitor 94 to the diac 88 is substantially lowered to the point where the potential is no longer sufficient to fire the diac 88. When the diac 88 is turned off, the triac 86 will likewise be kept in its nonconductive state and no current will be drawn through the coil 82. The spring-biased armature switch 84 will be released thereby closing the circuit from the alternating current power source 124 through the motor 68. When the motor 68 is energized, the cooling medium will be directed into the volume desired to be cooled. It is particularly noted that the circuit shown in FIG. 2 is symmetric so that when the negative phase of alternating signal derived from the source 124 is applied to the point of connection between the diodes 114 and 110, a similar operation will take place with regard to the transistors 110 and 108. As a result, when a high temperature decreases the impedance of the thermister 62, the transistor 110 will be biased more fully "on" thereby to prevent the firing of the diac 88 and the triac 86 with the result that the motor 68 is energized.

The control circuit shown in FIG. 2 has a particular advantage of being relatively stable under changes of temperature. It is noted that transistor are affected by changes in temperatures; in particular, transistors tend to conduct more current as their temperature increases. As seen in FIG. 2, a negative feedback path circuit is formed from the emitter of transistor 98 to the base of transistor 104. More particularly, as the current drawn from transistor 98 increases due to a temperature increase, a positive potential is applied to the base of transistor 104 which results in a negative potential being applied from the collector of transistor 104 to the base of transistor 98 thereby tending to render transistor 98 less conductive. A similar reaction occurs with transistor 110 and 108. Further, the circuits shown in FIGS. 1 and 2 are are characterized by the relatively small thermal lag between a change in the ambient temperature and the energization of the load. In particular, this is a result of the fact that the load such as a heating element is partially energized continuously during the operation of the apparatus.

The invention has been described in detail with particular reference to preferred embodiments thereof, but it will be understood that variations and modifications can be effected within the spirit and scope of the invention.

I claim:

1. Control apparatus for variably energizing a load from a source of AC voltage in accordance with the magnitude of a condition to be sensed, said control apparatus comprising:

first and second transistors each having base, emitter and collector terminals, said first and second transistors each having a conductive state and a nonconductive state, input means responsive to the source of AC voltage to apply a signal proportional to the amplitude of the AC voltage to the bases of said first and second transistors, first and second diodes connected to said collectors of said first and second transistors respectively, for applying the AC voltage to said collectors of said first and second transistors, condition sensing means having an impedance which varies as a function of the condition to be sensed, said condition sensing means being connected to said emitters of said first and second transistors, and circuit means connected to said first and second diodes to sense the current drawn by said condition sensing means alternatively from said first and second transistors to variably control the application of the source to the load.

2. Control apparatus as claimed in claim 1, wherein said first and second transistors are of opposite type.

3. Control apparatus as claimed in claim 1, wherein said circuit means includes a bidirectional diode responsive to positive and negative potential signals greater than a predetermined level, and a switching device having first, second and third terminals, said switching device being operative in a first state to present a relatively low impedance between said second and third terminals and in a second state to present a relatively high impedance between said second and third electrodes, said bidirectional diode being connected to said first terminal of said switching device.

4. Control apparatus as claimed in claim 1, wherein there is further included third and fourth transistors having base, emitter and collector terminals, said collector terminals of said third and fourth transistors being connected to said base terminals of said first and second transistors, said emitters of said third and fourth transistors being interconnected, and said bases of said third and fourth transistors being connected together.

5. Control apparatus as claimed in claim 1, wherein said input means includes variable resistance means for varying the amplitude of the input signal which is applied to said bases of said first and second transistors.

6. Control apparatus for variably energizing a load from a source of AC voltage in accordance with the magnitude of a sensed condition, said control apparatus comprising:

first and second electrical switches each having first, second and third terminals, said first and second electrical switches being operative in a first state to present a relatively low impedance between said second and third terminals and in a second state to present a relatively high impedance between said second and third terminals, input means responsive to the source of AC voltage to apply an input signal proportional to the amplitude of the AC voltage to said first terminals of said first and second electrical switches, first and second unidirectional conducting means connected for alternately applying the AC voltage to said second terminals of said first and second electrical switching means, condition sensing means having an impedance which varies as a function of the condition to be sensed, said condition sensing means being connected to said third terminals of said first and second electrical switching means, and circuit means coupled to said first and second electrical switching means alternatively by said first and second unidirectional conducting means to variably regulate the application of the source to the load.

7. A control circuit for variably applying a source of AC voltage as a function of temperature, said control apparatus comprising:

first and second transistors each having base, emitter and collector terminals, said first and second transistors each having a conductive state and a nonconductive state, input means responsive to the source of AC voltage to apply an input signal proportional to the amplitude of the AC voltage to said bases of said first and second transistors, first and second diodes connected to said collectors of said first and second transistors to alternatively apply the AC voltage to said first and second transistors, condition sensing means having an impedance which varies as a function of temperature, said condition sensing means being connected to said emitters of said first and second transistors, heat producing means, and circuit means connected to said first and second diodes to sense the current drawn by said condition sensing means alternatively from said first and second transistors to variably apply the source of AC voltage to said heat producing means.